US009661095B2

(12) United States Patent
Tani

(10) Patent No.: US 9,661,095 B2
(45) Date of Patent: May 23, 2017

(54) CONTENT MANAGEMENT SYSTEM, CONTENT MANAGEMENT APPARATUS, CONTENT MANAGEMENT METHOD, AND PROGRAM

(71) Applicant: CANON KABUSHIKI KAISHA, Tokyo (JP)

(72) Inventor: Kazuteru Tani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 439 days.

(21) Appl. No.: 14/173,701

(22) Filed: Feb. 5, 2014

(65) Prior Publication Data

US 2014/0258381 A1 Sep. 11, 2014

(30) Foreign Application Priority Data

Mar. 8, 2013 (JP) .................................. 2013-047118

(51) Int. Cl.
*G06F 15/16* (2006.01)
*H04L 29/08* (2006.01)

(52) U.S. Cl.
CPC .......... *H04L 67/2823* (2013.01); *H04L 67/28* (2013.01)

(58) Field of Classification Search
CPC ........................... H04L 67/28; H04L 67/2873
USPC ........................................................ 709/231
See application file for complete search history.

(56) References Cited

U.S. PATENT DOCUMENTS

| 7,315,386 | B1 * | 1/2008 | Shiimori | G06F 3/14 |
| | | | | 358/1.15 |
| 7,796,779 | B1 * | 9/2010 | Strong | G06T 11/60 |
| | | | | 345/619 |
| 2004/0246531 | A1 * | 12/2004 | Eguchi | H04N 1/00209 |
| | | | | 358/400 |
| 2007/0291337 | A1 * | 12/2007 | Hibi | H04N 1/00384 |
| | | | | 358/528 |
| 2008/0143742 | A1 * | 6/2008 | Jeong | G06T 11/60 |
| | | | | 345/619 |
| 2009/0202179 | A1 * | 8/2009 | Shivanna | G06F 19/321 |
| | | | | 382/311 |

(Continued)

FOREIGN PATENT DOCUMENTS

| JP | 2003-111008 A | 4/2003 |
| JP | 2005-004728 A | 1/2005 |

*Primary Examiner* — Karen Tang
(74) *Attorney, Agent, or Firm* — Canon USA, Inc. I.P. Division

(57) ABSTRACT

A content management system, in which a server apparatus communicates with a plurality of client apparatuses via a network, includes a first client apparatus including a selection unit for selecting content to be uploaded, an editing unit for editing the content, a storage unit for associating and storing the content and editing information about the content, and an upload unit for uploading the content and the editing information to the server apparatus. The server apparatus includes a content receiving unit for receiving the content from the first client apparatus, an acquisition unit for acquiring the editing information from the apparatus, and a transmission unit for transmitting information about the content and the editing information to a second client apparatus. The second client apparatus includes a display unit for displaying the information about the content and for selectively displaying predetermined information based on the editing information.

6 Claims, 9 Drawing Sheets

(56) References Cited

U.S. PATENT DOCUMENTS

| | | | | |
|---|---|---|---|---|
| 2010/0057761 A1* | 3/2010 | Nolhage | G06F 3/04845 | 707/E17.009 |
| 2010/0138385 A1* | 6/2010 | Palermiti | G06F 17/3028 | 707/610 |
| 2010/0260421 A1* | 10/2010 | Park | G06F 17/30265 | 382/180 |
| 2011/0035264 A1* | 2/2011 | Zaloom | G06Q 10/10 | 705/14.12 |
| 2011/0106798 A1* | 5/2011 | Li | G06F 17/30265 | 707/728 |
| 2012/0300066 A1* | 11/2012 | Park | H04N 7/185 | 348/143 |
| 2013/0086480 A1* | 4/2013 | Sirpal | G06F 3/1438 | 715/744 |
| 2013/0088748 A1* | 4/2013 | Mikami | H04N 1/00204 | 358/1.15 |
| 2013/0166656 A1* | 6/2013 | Taub | G06Q 50/01 | 709/206 |
| 2013/0238724 A1* | 9/2013 | Cunningham | H04L 51/24 | 709/206 |
| 2013/0239063 A1* | 9/2013 | Ubillos | H04L 51/24 | 715/838 |
| 2014/0050369 A1* | 2/2014 | Ghuge | H04N 1/2195 | 382/115 |
| 2014/0050419 A1* | 2/2014 | Lerios | G06T 3/0056 | 382/276 |
| 2014/0075335 A1* | 3/2014 | Hicks | G06Q 10/10 | 715/753 |

\* cited by examiner

CONTENT MANAGEMENT SYSTEM, CONTENT MANAGEMENT APPARATUS, CONTENT MANAGEMENT METHOD, AND PROGRAM

BACKGROUND OF THE INVENTION

Field of the Invention

The present invention relates to a content management system, a content management apparatus, a content management method, and a program.

Description of the Related Art

Conventionally, there has been known a technique in which an image uploaded from a client apparatus is managed by a server apparatus in a client-server system. For example, Japanese Patent Application Laid-Open No. 2003-111008 discusses a technique in which a server apparatus manages an image uploaded from the client apparatus of a registration user for the server apparatus, and the client apparatus of a viewing user downloads the image from the server apparatus, so that the image can be shared among users.

To reduce a communication load when uploading the image to the server apparatus, the client computer of the registration user may perform editing on the image, such as size-reduction processing, and then upload the edited image. Namely, in addition to the image uploaded to the server apparatus, there is a possibility that the unedited, high-resolution original image of the uploaded image is present on the client computer of the registration user.

However, the size of the original image may vary depending on the imaging conditions of the camera and the like. Thus, the server apparatus cannot determine whether the image received from the client computer of the registration user is an unedited original image or an edited image.

Consequently, even if the original image is present on the client computer in addition to the image uploaded to the server apparatus, the apparatus of the viewing user that has accessed the server apparatus cannot know the fact. Therefore, even if the original image is present on the client computer, the apparatus of the viewing user can only specify the edited image uploaded to the server apparatus as the target image to be processed (such as printed or downloaded). Namely, there has been a problem in that the original image corresponding to the image uploaded to the server apparatus cannot be utilized as the target image to be processed (such as printed or downloaded).

SUMMARY OF THE INVENTION

The present invention is directed to, when the apparatus of a viewing user utilizes content that is registered in a server apparatus, notifying the viewing user of the possibility that the client computer of a registration user has original content corresponding to the registered content.

According to an aspect of the present invention, a content management system includes a server apparatus and a plurality of client apparatuses that are capable of communicating with each other via a network. The plurality of client apparatuses includes a first client apparatus and a second client apparatus. The first client apparatus includes a selection unit configured to select content to be uploaded from among a plurality of pieces of content, an editing unit configured to edit the content to be uploaded that has been selected by the selection unit, a storage unit configured to associate and store the content to be uploaded and editing information indicating whether the content has been edited by the editing unit, and an upload unit configured to upload the content to be uploaded and the editing information to the server apparatus. The server apparatus includes a content receiving unit configured to receive the content from the first client apparatus, an acquisition unit configured to acquire the editing information about the content from the first client apparatus, and a transmission unit configured to transmit information relating to the content and the editing information to the second client apparatus. The second client apparatus includes a display unit configured to display the information relating to the content and to selectively display predetermined information based on the editing information.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Figure 1:
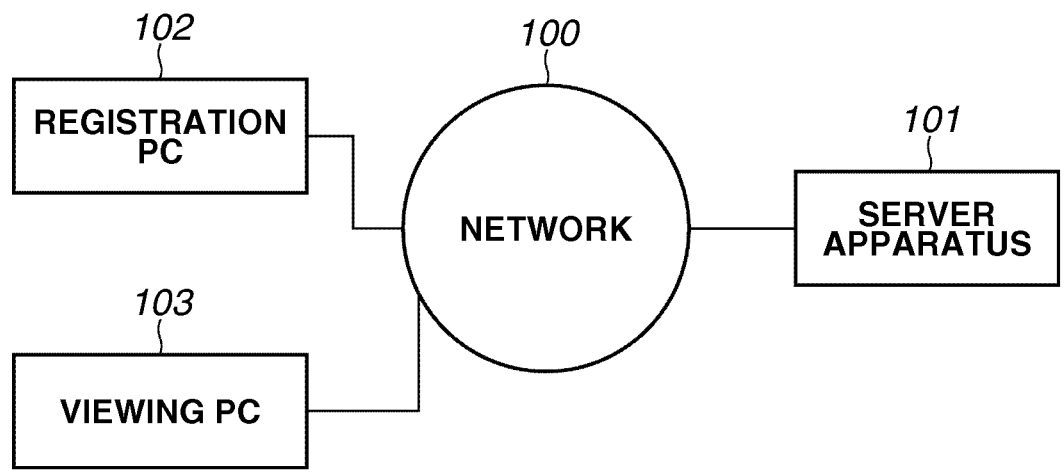
FIG. 1 illustrates a content management system.

FIG. 1 illustrates a content management system serving as a server-client system according to an exemplary embodiment of the present invention. The content management system includes a server apparatus 101, a registration personal computer (PC) 102, and a viewing PC 103. The server apparatus 101, the registration PC 102, and the viewing PC 103 are connected to each other via a network 100, such as the Internet. The server apparatus 101 manages content. The registration PC 102 registers content in the server apparatus 101. The viewing PC 103 issues to the server apparatus 101 a request for processing, such as viewing the content registered in the server apparatus 101. Although the content to be managed by the server apparatus 101 according to the present exemplary embodiment is still images and moving images, the type of content is not limited to that described in the exemplary embodiment. For example, the content may be audio, a document and the like.

The server apparatus 101 has an application server function. The registration PC 102 and the viewing PC 103 are examples of a client apparatus. Further, the registration PC 102 and the viewing PC 103 may be arranged in a single apparatus (PC) as respective applications. The registration PC 102 is an example of a first client apparatus, and the viewing PC 103 is an example of a second client apparatus. The server apparatus 101 is an information processing apparatus (computer) that includes, as described below, a central processing unit (CPU), a read-only memory (ROM), a random-access memory (RAM), a hard disk drive (HDD) and the like. The registration PC 102 and the viewing PC 103 are typical information processing apparatuses that include a network viewing unit, such as a browser. In the present exemplary embodiment, although the network 100 is described using the Internet as an example, the network 100 may also be some other network system that are connectable all the time, such as a local area network (LAN).

Figure 2:
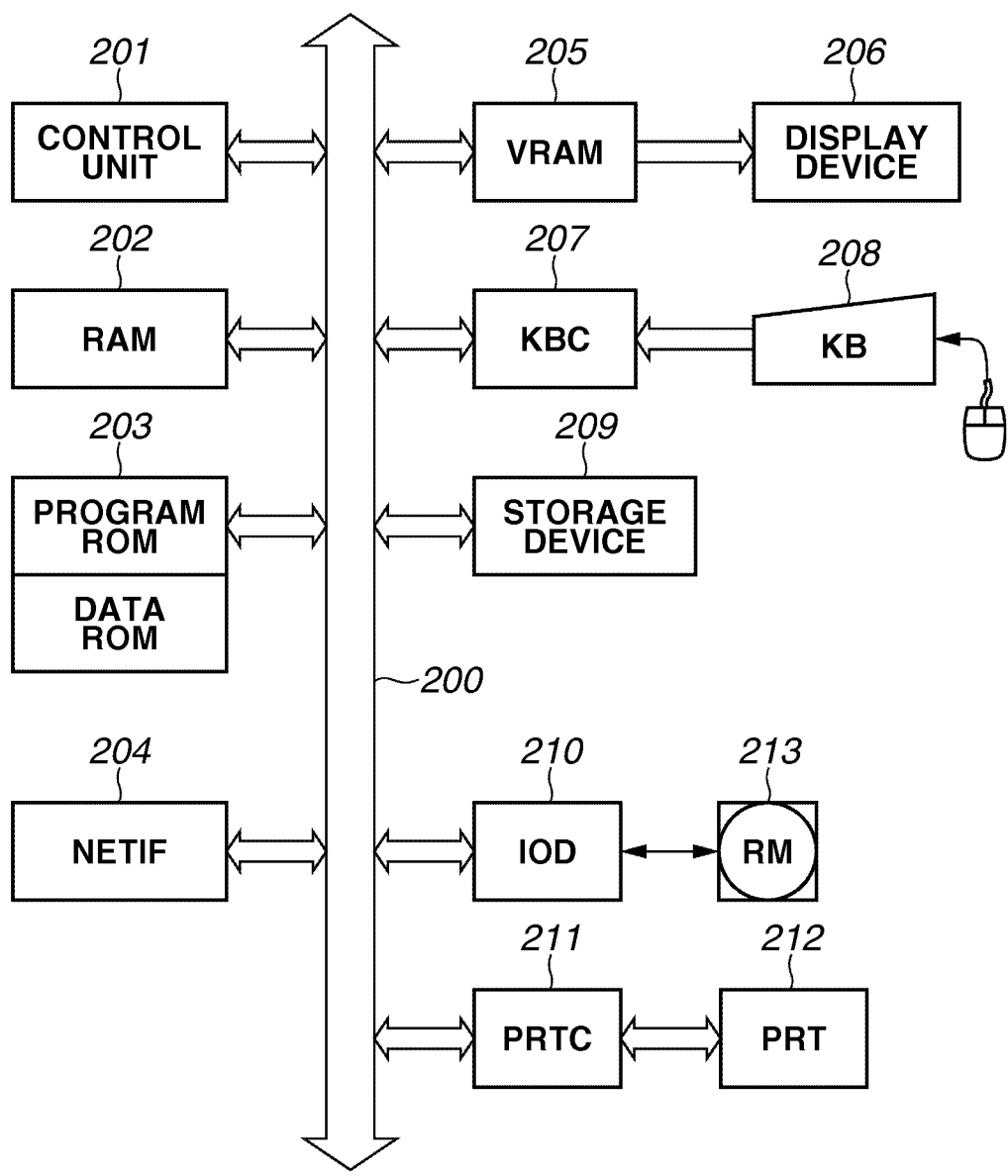
FIG. 2 illustrates an information processing apparatus.

FIG. 2 illustrates the configuration of an information processing apparatus realizing the server apparatus 101, the registration PC 102, and the viewing PC 103. The information processing apparatus includes a central processing unit 201 (hereinafter referred to as a control unit) that performs calculations and control in the image processing apparatus, a RAM 202 that functions as a main memory of the control unit 201 and also as an execution program storage area and an execution area and data area for the execution program, and a ROM 203 that stores an operation processing procedure (control program) of the control unit 201. The ROM 203 includes a program ROM that stores basic software (an operating system (OS)), which is a system program for performing device control of the information processing apparatus, and a data ROM that stores information necessary for the system to run. The storage location of each program may be a below-described storage device 209 instead of the ROM 203.

A network interface (NETIF) 204 performs control and connection situation diagnosis for transferring data to/from the information processing apparatus via the network 100. A video RAM (VRAM) 205 rasterizes an image indicating a running state of the below-described information processing apparatus for displaying the image on a screen of a display device 206, and controls the display. The display device 206 is a display, for example. A controller 207 (hereinafter referred to as KBC) controls input signals from an external input device 208 (hereinafter referred to as KB), which receives operations made by a user. The KB 208 is, for example, a pointing device such as a keyboard or a mouse.

A storage device 209, which is realized by a HDD and the like, stores application programs and various types of data. An external input/output device (hereinafter referred to as IOD) 210 inputs and outputs data to/from a removable disk such as a flexible disk drive or a compact disc (CD) ROM drive. The IOD 210 is used, for example, for reading from a medium containing the above-described application programs. A magnetic recording medium 213 is read by the IOD 210. The magnetic recording medium 213 is, for example, a flexible disk (hereinafter referred to as RM) or an external hard disk. However, the storage medium is not limited to a flexible disk. The storage medium may be, for example, a removable data storage device (removable media), such as an optical recording medium (e.g., a CD-ROM), a magneto-optical recording medium (e.g., a MO), or a semiconductor recording medium (e.g., a memory card). The application programs and data stored by the storage device 209 may also be stored in the IOD 210.

A printer controller 211 (hereinafter referred to as PRTC) controls an output signal to a printing apparatus 212 (hereinafter referred to as PRT). A laser beam printer (LBP) is used as the PRT 212, for example. A transmission bus 200 (address bus, data bus, input/output bus, and control bus) connects the respective units described above with each other. The information stored in the processing modules required for the calculations by the control unit 201 and in the information storage devices is transferred, for example, from the ROM 203, the storage device 209, the IOD 210, or the RAM 202 to the RAM 202, and then transmitted to the control unit 201. If necessary, the result calculated by the control unit 201 is written, for example, to the RAM 202, the storage device 209, or the IOD 201, which serves as an information storage device. At the same time, if necessary, the result calculated by the control unit 201 is displayed on the display device 206 via the VRAM 205.

Transmission among the control unit 201, the RAM 202, the ROM 203, the NETIF 204, the VRAM 205, the KBC 207, the storage device 209, and the IOD 210 is performed via the transmission bus 200. The below-described respective functions and processes of the server apparatus 101, the registration PC 102, and the viewing PC 103 are realized by the control unit 210 of each of the apparatuses which reads a program stored in the ROM 203 or the storage device 209 and executes the program.

Figure 3:
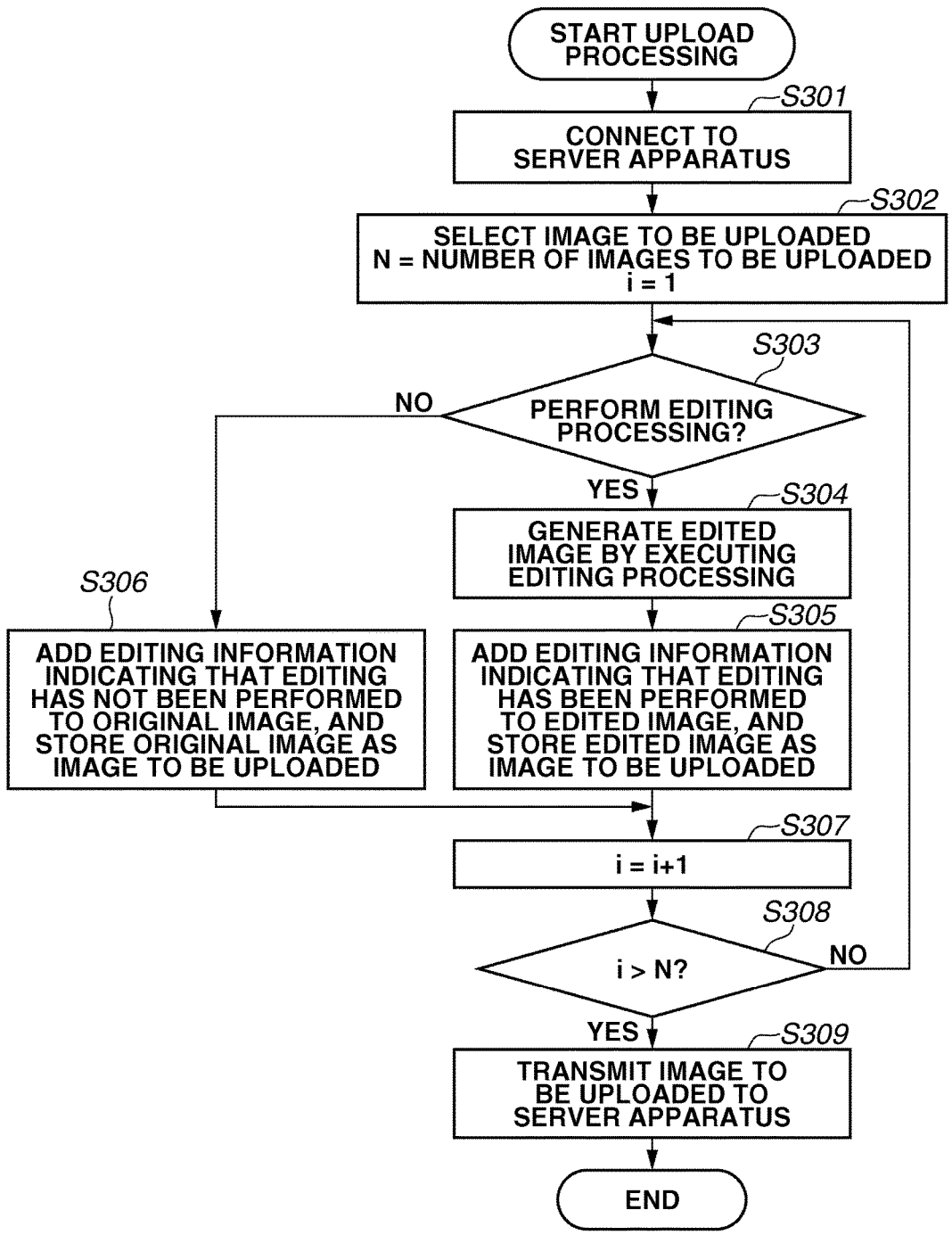
FIG. 3 is a flowchart illustrating upload processing.

FIG. 3 is a flowchart illustrating upload processing by the registration PC 102. In the upload processing, the registration PC 102 uploads an image obtained from an imaging apparatus, such as a digital camera, or from an image input device, such as a scanner, to the server apparatus 101. First, in step S301, the control unit 201 connects to the server apparatus 101 via the network 100 using a network viewing unit, such as a web browser program. Next, in step S302, the control unit 201 selects an image to be uploaded from among the images stored in the storage device 209. The images stored by the storage device 209 may be either still images or moving images. The control unit 201 sets the number of selected images as a variable N, and sets "1" as a variable i.

Next, in step S303, the control unit 201 sets for each image selected in step S302 whether it is necessary to perform editing processing, such as resizing or trimming. The control unit 201 sets whether it is necessary to perform editing processing based on the input of an instruction from the user, for example. If it is determined in step S303 that it is necessary to perform editing processing (YES in step S303), the processing proceeds to step S304. If it is determined in step S303 that it is not necessary to perform editing processing (NO in step S303), the processing proceeds to step S306. In step S304, the control unit 201 generates an edited image by executing resizing or trimming processing on an image determined as requiring editing processing. This edited image is an example of edited content. Further, the processing performed in step S304 is an example of editing processing.

Next, in step S305, the control unit 201 adds to the edited image the editing information indicating that editing has been performed, stores the edited image in the storage device 209 as an image to be uploaded, and the processing then proceeds to step S307. Specifically, the control unit 201 associates and stores in the storage device 209 the edited image and the editing information. Alternatively, the control unit 201 may embed editing information in the edited image, and manage the image as a single piece of information. Further, in step S306, the control unit 201 adds to an image that has been determined as not requiring editing processing the editing information indicating that the image is an original image. The control unit 201 then stores the image in the storage device 209 as an image to be uploaded, and the processing proceeds to step S307.

In step S307, the control unit 201 adds "1" to the variable i. Next, in step S308, the control unit 201 compares the addition result obtained in step S307 with the total number (variable N) of images to be uploaded. If the variable i is greater than the variable N (YES in step S308), the processing proceeds to step S309. If the variable i is equal to or less than the variable N (NO in step S308), the processing returns to step S303. In step S309, the control unit 201 associates registration user information, including the name and email address of the registration user, the editing information, and the image to be uploaded with each other, transmits the associated image and information to the server apparatus 101, and request the server apparatus 101 to register the image and information. Then the processing is ended. The processing performed is step S309 is an example of transmission processing. The image to be uploaded in step S309 is an image after editing, namely, an edited image, or the original image. Images to be uploaded that are transmitted to the server apparatus 101 may include both the edited image and the original image.

Figure 4:
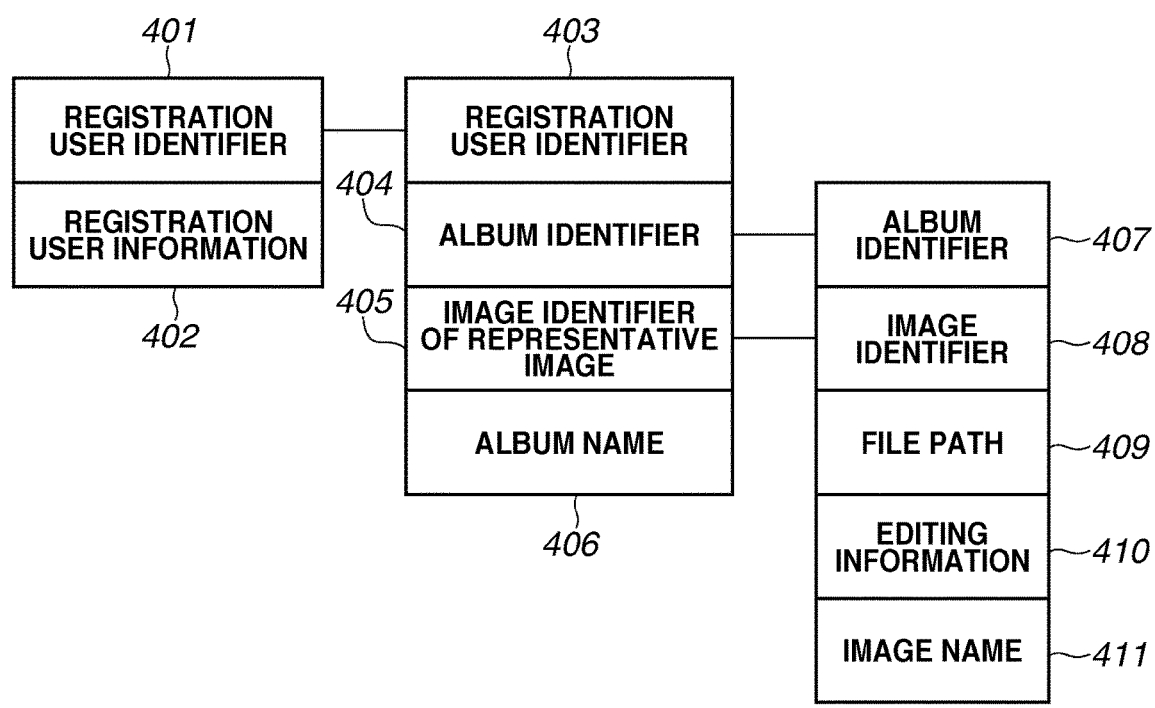
FIG. 4 illustrates an example of information stored in a storage device of a server apparatus.

In response to the processing performed in step S309, at the server apparatus 101, the control unit 201 associates and stores in the storage device 209 the registration user information, the editing information, and the image to be uploaded. FIG. 4 illustrates an example of information stored in the storage device 209 of the server apparatus 101. The storage device 209 of the server apparatus 101 associates and stores as registration user information a registration user identifier 401 and registration user information 402. The registration user identifier 401 is information unique to the registration user and is issued by the control unit 201 of the server apparatus 101. The registration user information 402 is information transmitted by the registration PC 102.

The storage device 209 of the server apparatus 101 also associates and stores as album details information a registration user identifier 403, an album identifier 404, an image identifier 405 of a representative image, and an album name 406. The album identifier 404 is information unique to the album. An album may include a plurality of images. Namely, an album is an example of a group to which a plurality of images (content) belongs. The registration user identifier 403 is the registration user identifier of the album registration user. The album details information and the registration user identification information are linked by the registration user identifier. Thus, the storage device 209 classifies and stores a plurality of images into a plurality of albums, namely, a plurality of groups. The storage device 209 of the server apparatus 101 also associates and stores as image details information an album identifier 407, an image identifier 408, a file path 409 to image data, editing information 410, and an image name 411. The image identifier 408 is information unique to an image belonging to an album specified by the album identifier 407. If an album has a plurality of images, a plurality of image identifiers 408 is associated with one album identifier 407. The image identifier and the album identifier are information issued by the control unit 201 of the server apparatus 101. The album details information and the image details information are linked by the album identifier.

Figure 5A:
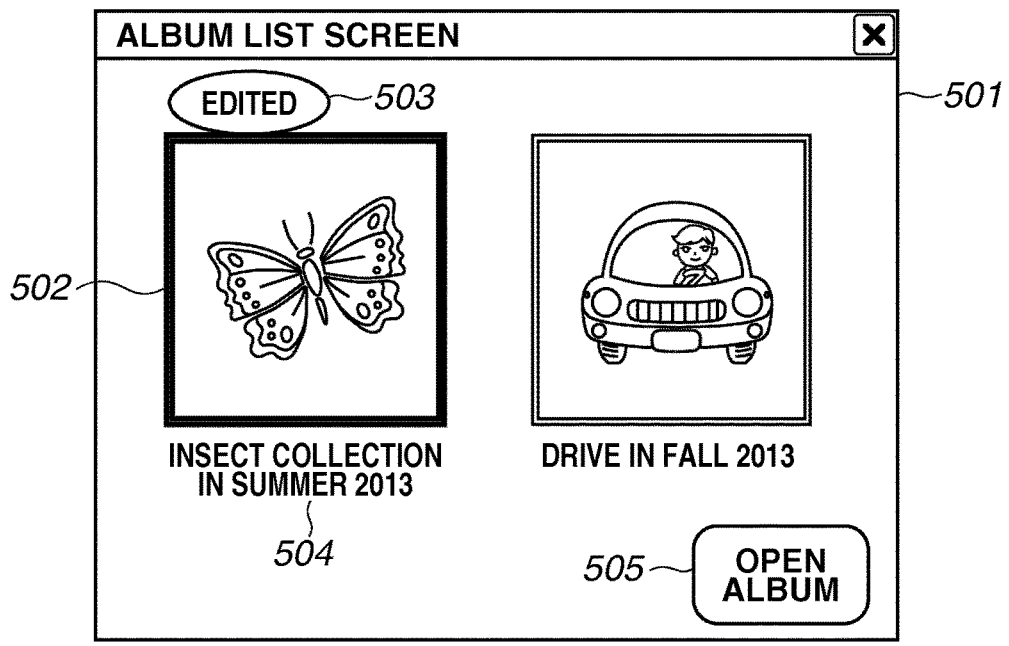
FIGS. 5A and 5B illustrate an example of an album list screen and an example of an album details screen, respectively.
Figure 5B:
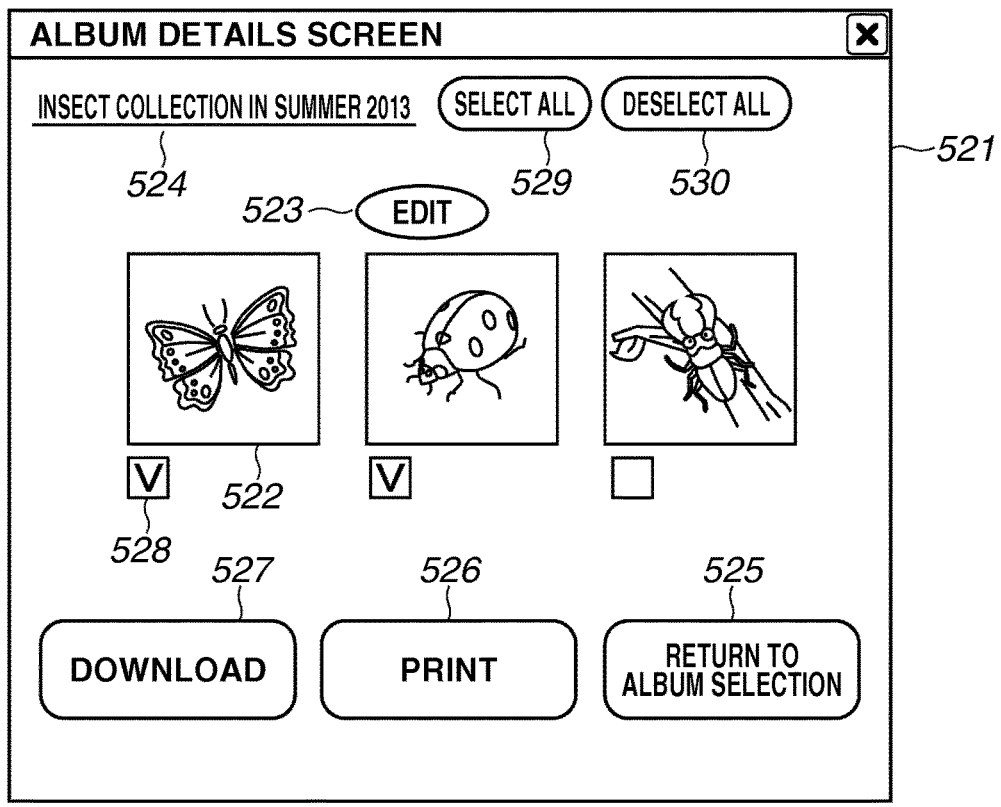

FIGS. 5A and 5B illustrate an example of an album list screen and an example of an album details screen displayed on the display device 206 of the viewing PC 103, respectively. FIG. 5A illustrates an example of an album list screen. Thumbnail images 502 obtained by reducing a representative image of each album to a display size are displayed on the album list screen 501 illustrated in FIG. 5A. If an album includes an edited image, an edit mark 503 indicating that an edited image is included therein is displayed near the thumbnail image 502. Further, an album name 504 is displayed near the thumbnail images 502. If one of the thumbnail images 502 is selected by the viewing PC 103 based on an operation performed by the viewing user, and an "open album" button 505 is pressed, the viewing PC 103 issues a request to the server apparatus 101 for the album details display data of the album specified by the album identifier of the selected album. In response to the request, the server apparatus 101 generates the album details display data, and transmits the generated album details display data to the viewing PC 103. The viewing PC 103 displays an album details screen on the display device 206 based on the album details display data.

FIG. 5B illustrates an example of an album details screen. Thumbnail images 522 obtained by reducing the images included in the album selected by the user to a display size are displayed in a line on the album details screen 521 illustrated in FIG. 5B. If the image is an edited image, an edit mark 523 indicating that the image is an edited image is displayed near the thumbnail image 522. Further, an album name 524 of the album being displayed is displayed on the album details screen 521. As another example, the album list screen 501 may also display near the thumbnail image 502 of an album that includes only original images a mark indicating that the images are all original images. Similarly, the album details screen 521 may also display near an original image a mark indicating that the image is an original image. Thus, both the album list screen 501 and the album details screen 521 only have to display information that allows the user to determine whether an edited image is included. The exemplary embodiment is not limited to a specific display format.

When a "return to album selection" button 525 is pressed on the viewing PC 103 by the viewing user, the viewing PC issues a request to the server apparatus 101 for album list data. Then, the server apparatus 101 generates album list display data corresponding to the above-described album list screen 501, and transmits the generated album list display data to the viewing PC 103. The viewing PC 103 displays the album list screen 501 on the display device 206 based on the album list display data. When a "print" button 526 is pressed on the viewing PC 103 by the viewing user, the viewing PC 103 issues a request to the server apparatus 101 for print processing of the image data corresponding to the selected thumbnail image 502. When a "download" button 527 is pressed by the viewing user, the viewing PC 103 issues a request to the server apparatus 101 for download processing of the image data corresponding to the selected thumbnail image 522. Here, if the viewing user selects a thumbnail image 522 as a target for print processing or download processing, a checkbox 528 is checked (set to on) to put the thumbnail image 522 in a selected state, while if the viewing user does not select a thumbnail image 522, the checkbox 528 is unchecked (set to off) to put the thumbnail image 522 in a deselected state. Further, when a select all button 529 is pressed by the viewing user, the checkboxes 528 for all the thumbnail images 522 belonging to the album are set to on. On the other hand, when a deselect all button 530 is pressed by the viewing user, the checkboxes 528 for all the thumbnail images 522 belonging to the album are set to off.

Figure 6:
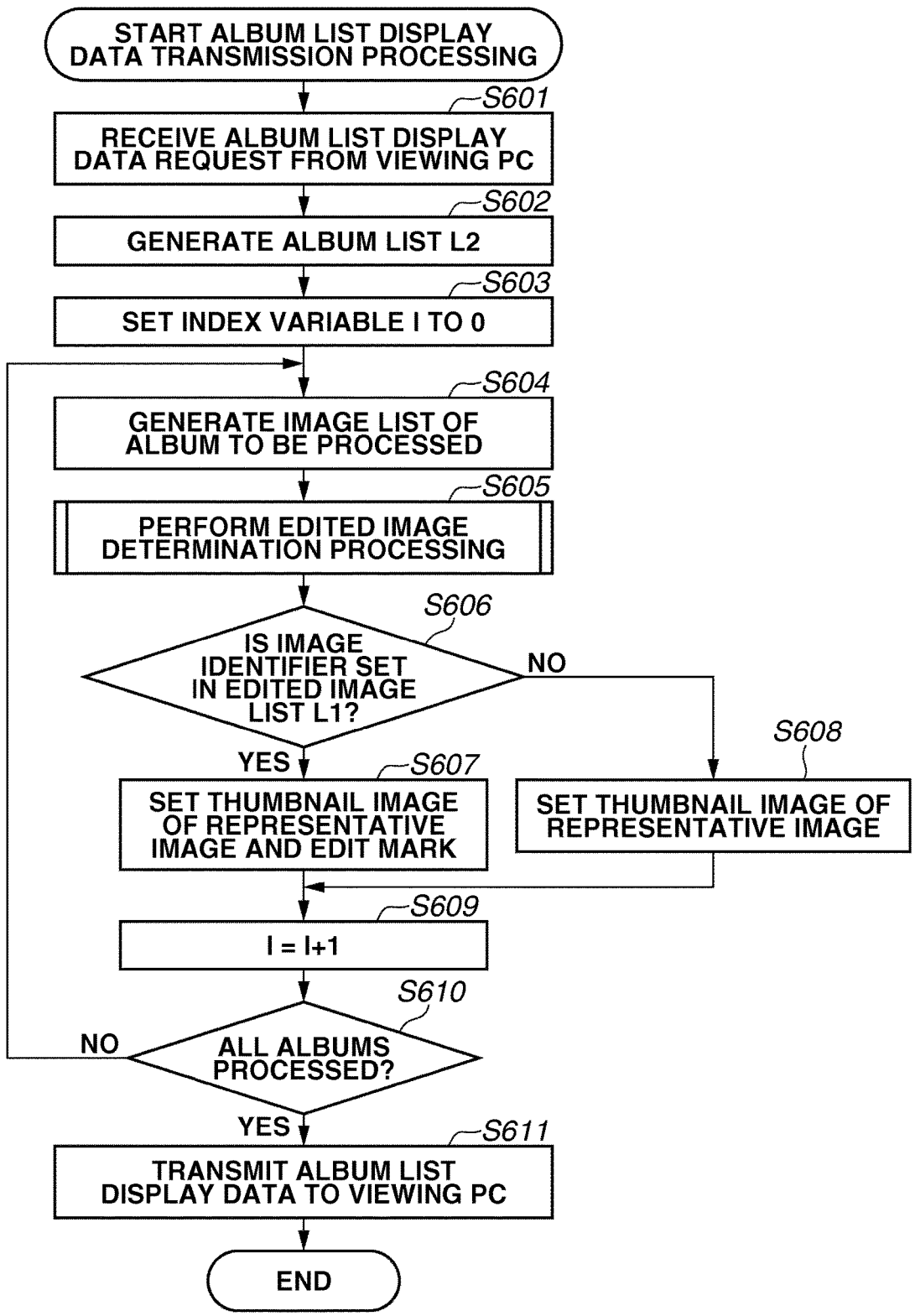
FIG. 6 is a flowchart illustrating album list display data transmission processing.

FIG. 6 is a flowchart illustrating processing for transmitting album list display data that is performed by the server apparatus 101. The album list display data is information for displaying the album list screen 501 illustrated in FIG. 5A. The album list display data is an example of group display data.

First, a request for the album list display data is transmitted from the viewing PC 103. At this time, the viewing PC 103 transmits to the server apparatus 101 specification information specifying the album the user wishes to view, namely, specification information specifying content included in the album, along with the request for the album list display data. The request for the album list display data is information requesting that the specified content be displayed in units of albums, namely, is an example of a request to display the specified content in units of groups. For example, if the viewing user of the viewing PC 103 has input specification information that specifies the registration user of the album the user wishes to view, the viewing PC 103 uses the registration user identifier as the specification information of the content. Specifically, the viewing PC 103 notifies the server apparatus 101 of the registration user identifier of the album the user wishes to view based on an argument of the URL used to connect to the server apparatus 101.

The content specification information is not limited to that described in the exemplary embodiment. As another example, the server apparatus 101 may add a tag to the album. Further, the viewing user of the viewing PC 103 may transmit to the server apparatus 101 specification information specifying the album to which a specified tag has been added by specifying the tag. When the server apparatus 101 has received a request for the album list display data from the viewing PC 103, the server apparatus 101 executes album list display data transmission processing. Namely, first, in step S601, the control unit 201 of the server apparatus 101 receives from the viewing PC 103 a request for the album list display data along with the specification information.

Next, in step S602, the control unit 201 searches for the album identifier 404 associated with the received registration user identifier 403, and acquires the image identifier 405 of the representative image associated with the album identifier 404. Then, the control unit 201 associates a pair formed from the acquired album identifier 404 and the image identifier 405 of the representative image with an index I, and sets the pair in an album list L2. Namely, the control unit 201 generates an album list L2. The index I, which is a consecutive number from "0", "1", "2" . . . , is information for managing the number of albums registered in the album list L2. Next, in step S603, the control unit 201 sets the variable I of the index to "0". Then, in step S604, the control unit 201 specifies the album identifier 404 that is to be processed from the album identifiers 404 included in the album list L2 acquired in step S602. The album identifier 404 that is to be processed is the album identifier 404 that is associated with the index I set in the variable I of the index. Further, the control unit 201 acquires the image identifier 408 associated with the album identifier 407 that matches the specified album identifier 404. Then, the control unit 201 generates an image list that includes the acquired image identifier 408, namely, an image list of the album to be processed.

Next, in step S605, the control unit 201 executes edited image determination processing. In edited image determination processing, the control unit 201 determines whether an edited image is included among the images identified by the image identifier included in the image list generated in step S604. Then, the control unit 201 generates an edited image list that includes the image identifier of the edited image. The edited image determination processing will be described below with reference to FIG. 7. Next, in step S606, the control unit 201 determines whether the image identifier of the edited image is set in the edited image list. Namely, the control unit 201 determines whether editing has been performed on the images included in the image list of the album to be processed based on whether the image identifier of the edited image is included in the image list of the album to be processed. If the control unit 201 determines that the image identifier of the edited image is set (YES in step S606), the processing proceeds to step S607. If the control unit 201 determines that the image identifier of the edited image is not set (NO in step S606), the processing proceeds to step S608.

In step S607, the control unit 201 acquires the image data of the representative image associated with the index I that matches the index variable I in the album list L2. Specifically, the control unit 201 specifies the file path 409 to the image data associated with the image identifier 408 matching the image identifier 405 of the representative image, and acquires the image data based on the file path 409. Next, the control unit 201 generates a thumbnail image by reducing the acquired image data to a display size. Next, the control unit 201 sets the thumbnail image and an edit mark in the album list display data so that the thumbnail image and the edit mark are displayed associated with each other. Specifically, the control unit 201 produces a layout in which an edit mark is displayed at a position adjacent to the thumbnail image, as illustrated in FIGS. 5A and 5B. However, the specific method for producing this layout is not limited to that described in the exemplary embodiment, as long as the thumbnail image and the edit mark are arranged so that the relationship between them can be recognized by the user. Further, although the thumbnail image is information representing an album, as information representing the album, the control unit 201 may also use information other than a thumbnail image of the representative image. As another example, the control unit 201 may use the album name. In this case, the album name and the edit mark are set in the album list display data. On the album list screen 501 illustrated in FIGS. 5A and 5B, the album name and the thumbnail image are displayed.

In step S608, the control unit 201 acquires the image data of the representative image of the index I matching the index variable I in the same manner as the processing performed in step S607. Further, the control unit 201 generates a thumbnail image from the image data, and sets the generated thumbnail image in the album list display data so that it is displayed as the representative image of the album. The processing performed in step S608 does not involve an edit mark. This album list display data is an example of group display data displayed in a manner that allows the user to identify whether an edited image is included based on the presence of an edit mark. Further, the processing of steps S607 and S608 is an example of group display data generation processing.

Next, in step S609, the control unit 201 sets "I+1" for the index variable I. Then, in step S610, the control unit 201 determines whether all of the image lists of the albums included in the album list L2 generated in step S602 have been processed. If the control unit 201 determines that processing of all of the albums has been completed (YES in step S610), the processing proceeds to step S611. If the control unit 201 determines that there is an album that has not been processed (NO in step S610), the processing returns to step S604, and the control unit 201 continues processing on the album that has not been processed. In step S611, the control unit 201 transmits the generated album list display data to the viewing PC 103, and then finishes the processing. In response to this, the viewing PC 103 receives the album list display data, and displays the album list display data on the display device 206.

Figure 7:
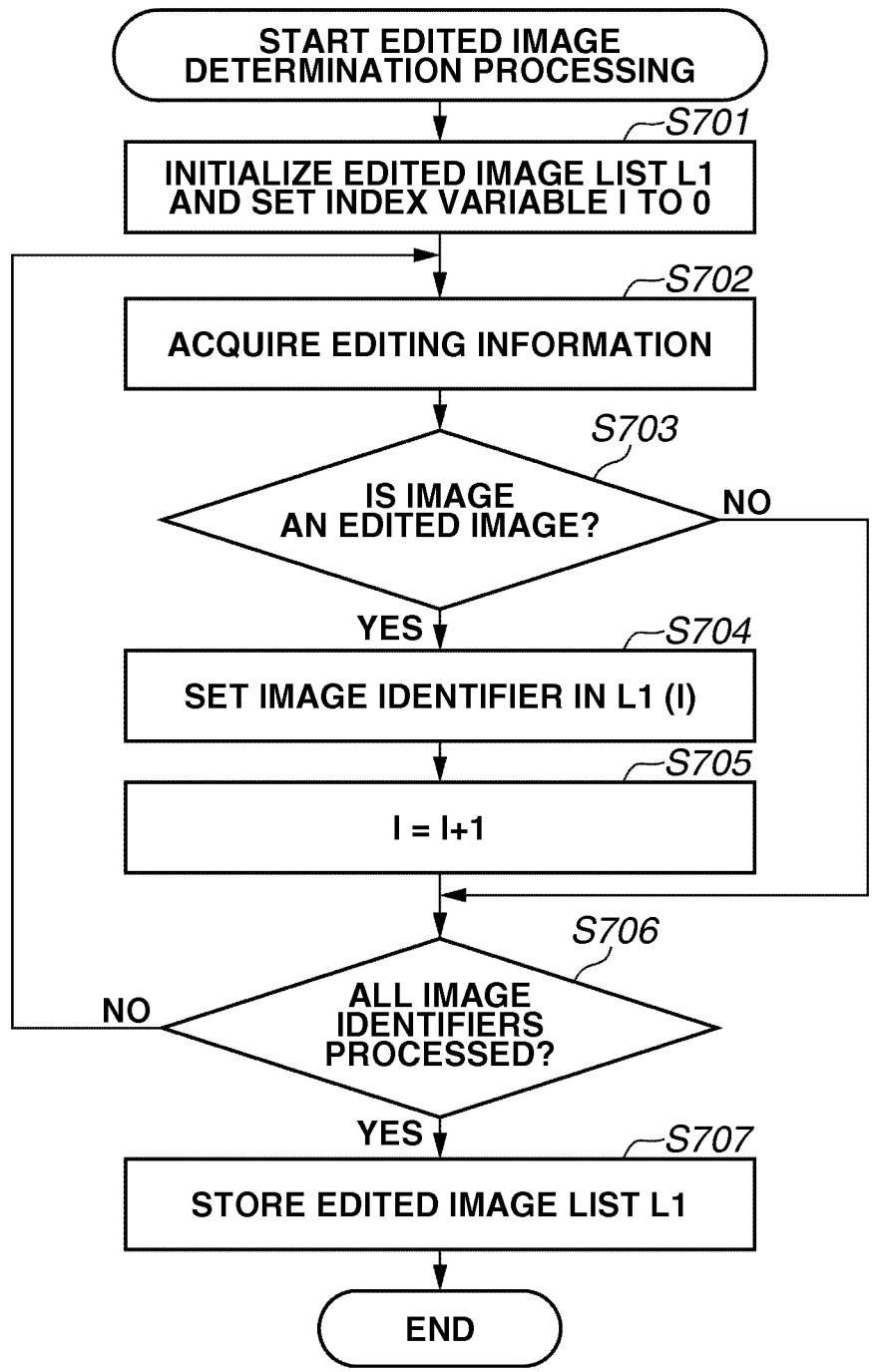
FIG. 7 is a flowchart illustrating edited image determination processing.

FIG. 7 is a flowchart illustrating the detailed processing performed in the edited image determination process (step S605) by the server apparatus 101. First, in step S701, the control unit 201 of the server apparatus 101 initializes an edited image list L1. Further, the control unit 201 sets the index variable I of the edited image list L1 to "0". This index variable I is information for managing the number of edited images registered in the edited list L1. Next, in step S702, the control unit 201 acquires a non-processed image identifier 408 from the image list as a processing target. Then, the control unit 201 acquires editing information 410 associated with the acquired image identifier 408. Next, in step S703, the control unit 201 determines whether the image specified by the image identifier 408 is an edited image based on the editing information 410 acquired in step S702.

If the control unit 201 determines that the image specified by the image identifier 408 is an edited image (YES in step S703), the processing proceeds to step S704. If the control unit 201 determines that the image specified by the image identifier 408 is not an edited image (NO in step S703), namely, that the specified image is an original image, the processing proceeds to step S706. In step S704, the control unit 201 stores the image identifier of the processing target in association with the index I of the edited image list L1 that matches the index variable I. Next, in step S705, the control unit 201 sets the index variable I to "I+1". Then, in step S706, the control unit 201 determines whether the processing of steps S702 to S705 has been performed on all of the image identifiers 408 included in the image list. If the control unit 201 determines that the processing of all the image identifiers 408 has been completed (YES in step S706), the processing proceeds to step S707.

If the control unit 201 determines that there is an image identifier 408 that has not been processed (NO in step S706), the processing returns to step S702, and the control unit 201 continues processing on the image identifier 408 that has not been processed. In step S707, the control unit 201 stores the obtained edited image list L1 in the RAM 202 or the storage device 209 of the server apparatus 101, and then finishes the processing.

Figure 8:
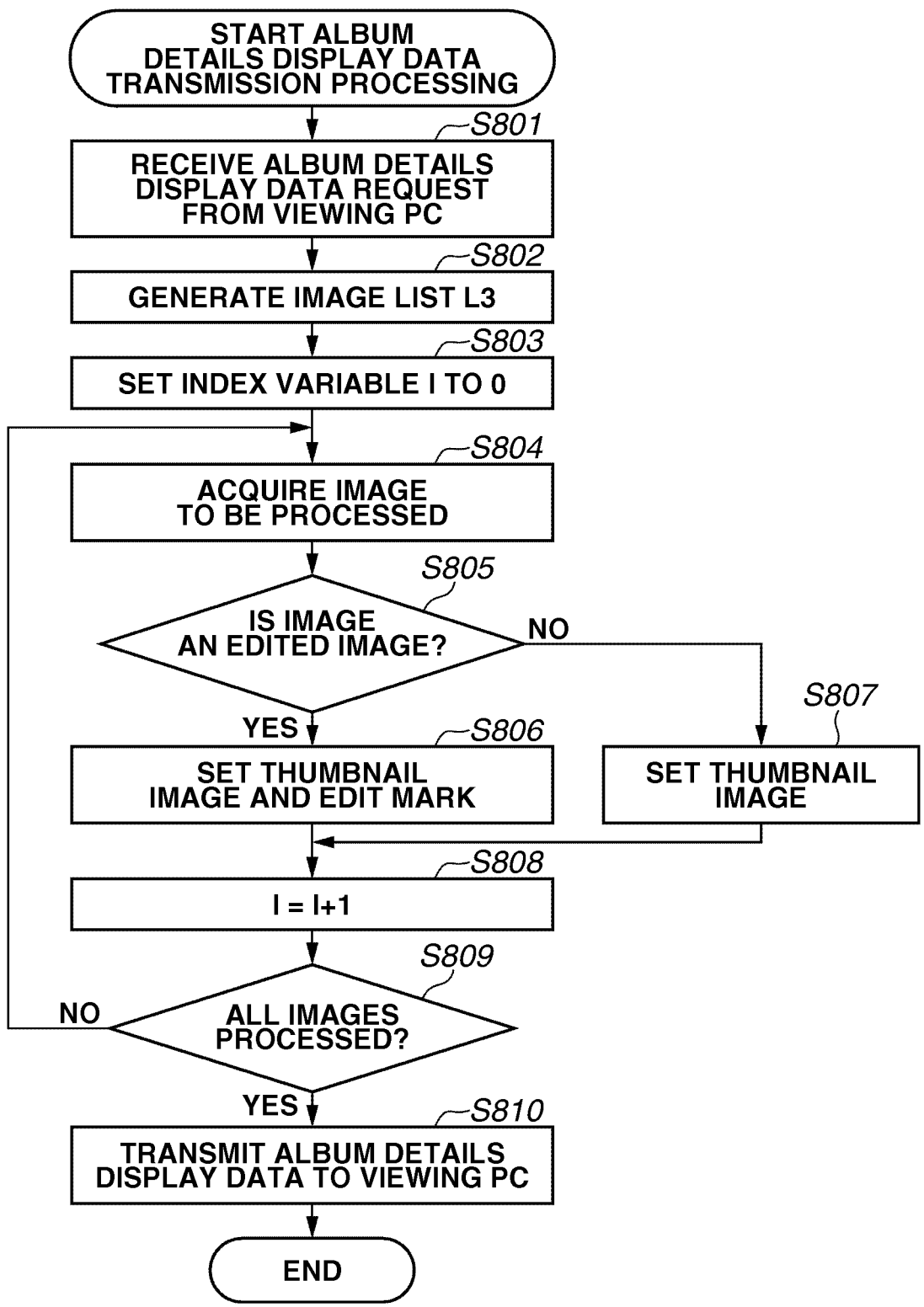
FIG. 8 is a flowchart illustrating album details display data transmission processing.

FIG. 8 is a flowchart illustrating the album details display data transmission processing performed by the server apparatus 101. For example, at the viewing PC 103, when the album desired by the viewing user has been selected on the album list screen 501 illustrated in FIG. 5A, and the "open album" button 505 has been pressed, the viewing PC 103 transmits a request for the album details display data to the server apparatus 101 along with specification information specifying the selected album. This request for the album details display data is an example of a request to display specified content. Further, the specification information transmitted with the request for the album details display data is specification information specifying the content included in the album by specifying the album.

When the server apparatus 101 has received the request for the album details display data, the server apparatus 101 executes transmission processing of the album details display data. Namely, first, in step S801, the control unit 201 of the server apparatus 101 receives the request for the album details display data along with the specification information specifying the album. The album includes one image, or two or more images. Namely, the specification information transmitted in step S801 is specification information specifying one image, or two or more images. Next, in step S802, the control unit 201 searches for the file path 409 to the image data and the editing information 410 that are associated with the album identifier 407 matching the album identifier 404 of the requested album. Further, the control unit 201 associates a group formed from the image identifier 408, the file path 409, and the editing information 410 with the index I, and sets the group in the image list L3. Namely, the control unit 201 generates an image list L3.

Next, in step S803, the control unit 201 sets the index variable I to "0". Then, in step S804, the control unit 201 acquires the image to be processed from the image list L3. Specifically, the control unit 201 acquires the image identifier 408, the image data 409, and the editing information 410 associated with the index I matching the index variable I in the image list L3. Next, in step S805, the control unit 201 determines whether the image to be processed is an edited image based on the editing information 410 acquired in step S804. If the control unit 201 determines that the image to be processed is an edited image (YES in step S805), the processing proceeds to step S806. If the control unit 201 determines that the image to be processed is not an edited image (NO in step S805), namely, is an original image, the processing proceeds to step S807.

In step S806, the control unit 201 acquires the image data based on the file path 409 to the image data. Further, the control unit 201 generates a thumbnail image by reducing the acquired image data to a display size. Next, the control unit 201 sets the thumbnail image and an edit mark in the album details display data so that the thumbnail image and the edit mark are displayed associated with each other. Although the thumbnail image is information representing an image, the control unit 201 may also use information other than a thumbnail image as the information representing the image. As another example, the control unit 201 may use the image name. In this case, the image name and the edit mark are set in the album details display data.

Further, as another example, the control unit 201 may use the thumbnail image and the image name. In this case, in the album details display data, the thumbnail image and the image name are set so that the image name is displayed below the thumbnail image, and an edit mark is also set.

In step S807, the control unit 201 generates a thumbnail image in the same manner as the processing performed in step S806. Further, the control unit 201 sets the thumbnail image in the album details display data. In step S807, an edit mark is not added.

This album details display data is an example of content display data displayed in a manner that allows the user to identify whether an image is an edited image based on the presence of an edit mark. Further, the processing of steps S806 and S807 is an example of content display data generation processing.

Next, in step S808, the control unit 201 sets "I+1" for the index variable I. Then, in step S809, the control unit 201 determines whether all of the images included in the image list L3 have been processed. If the control unit 201 determines that the processing of all of the images has been completed (YES in step S809), the processing proceeds to step S810. If the control unit 201 determines that there is an image that has not been processed (NO in step S809), the processing returns to step S804, and the control unit 201 continues processing on the image that has not been processed. In step S810, the control unit 201 transmits the generated album details display data to the viewing PC 103, and then finishes the processing. In response to this, the viewing PC 103 receives the album details display data, and displays the album details display data on the display device 206.

Figure 9:
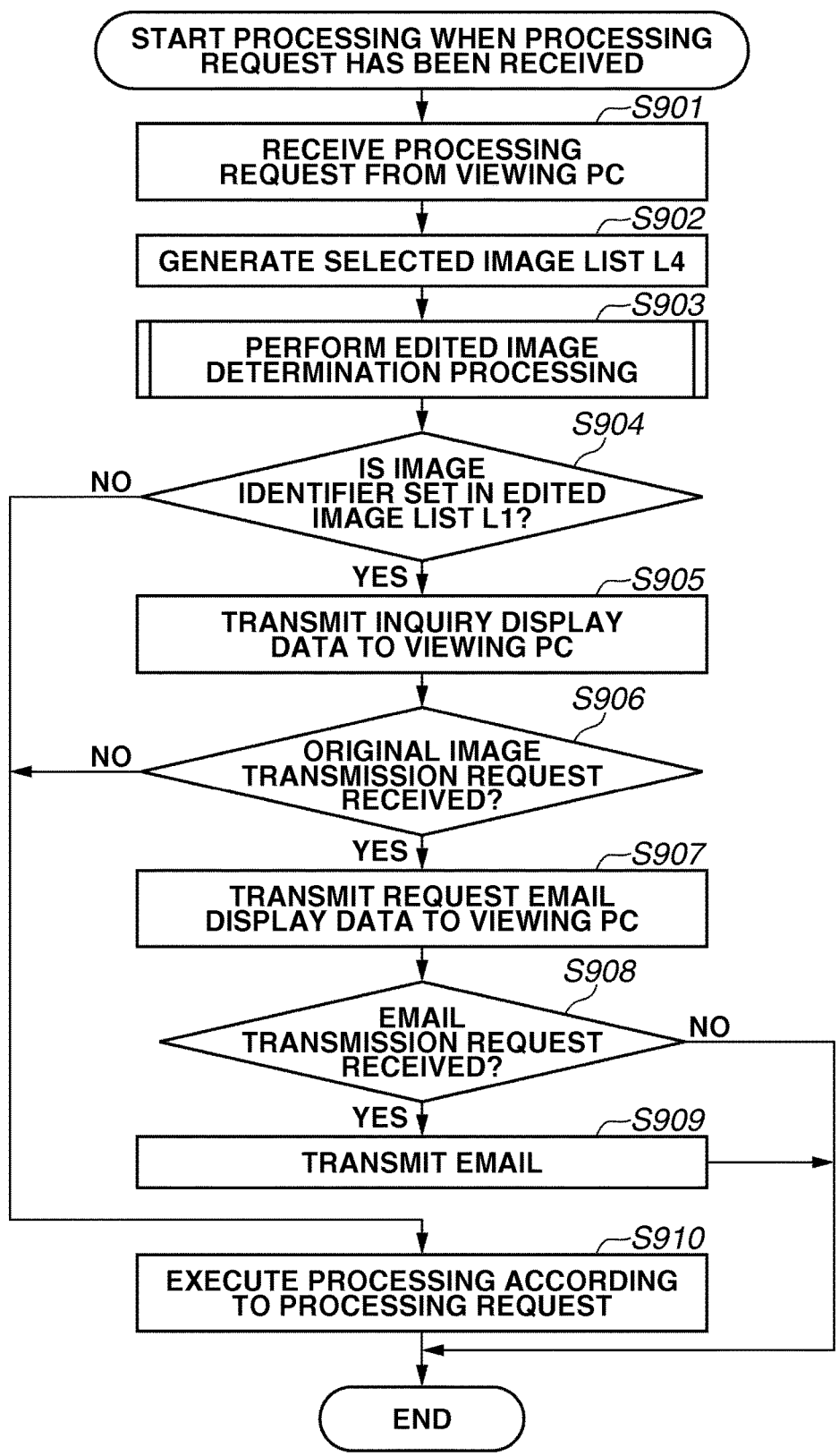
FIG. 9 is a flowchart illustrating processing performed when an execution request has been received.

FIG. 9 is a flowchart illustrating processing performed when a request has been received to execute predetermined processing registered in advance in the server apparatus 101. In the server apparatus 101, processing for which it is better to use the original image rather than an edited image is preset as predetermined processing in the storage device 209. For example, if an edited image has a lower resolution than the original image, when performing print processing or download processing, a better result can be obtained by using the original image. Accordingly, the server apparatus 101 presets print processing or download processing as predetermined processing. The predetermined processing can be arbitrarily set by the user of the server apparatus 101, and also be changed as appropriate.

First, at the viewing PC 103, the image to be processed is specified by the user, and an execution request for requesting execution of predetermined processing is input. In response to this, the viewing PC 103 transmits the execution request for the predetermined processing to the server apparatus 101. In step S901, the control unit 201 of the server apparatus 101 receives the execution request for the predetermined processing and the specification information specifying the image to be processed. Next, in step S902, the control unit 201 acquires the image identifier 408 of the image specified by the specification information. Then the control unit 201 generates an image list L4 that includes the acquired image identifier 408.

Next, in step S903, the control unit 201 executes the edited image determination processing described with reference to FIG. 7. Next, in step S904, the control unit 201 determines whether the image identifier of the edited image is set in the edited image list, namely, whether an edited image is included in the image list. If the control unit 201 determines that the image identifier of the edited image is set (YES in step S904), the processing proceeds to step S905. If the control unit 201 determines that the image identifier of the edited image is not set (NO in step S904), the processing proceeds to step S910. In step S905, the control unit 201 transmits to the viewing PC 103 inquiry display data about original image transmission. This inquiry display data is information for asking the viewing user of the viewing PC 103 whether to request transmission of the original image. The inquiry display data is an example of an editing notification. At the viewing PC 103, an inquiry screen is displayed on the display device 206 based on the inquiry display data.

If the viewing user wants the original image to be transmitted, the viewing user inputs into the viewing PC 103 a transmission request for the original image. In response to this, the viewing PC 103 transmits the transmission request for the original image to the server apparatus 101. Next, in step S906, the control unit 201 determines whether a transmission request for the original image has been received from the viewing PC 103. If the control unit 201 determines that a transmission request for the original image has been received (YES in step S906), the processing proceeds to step S907. If the control unit 201 determines that a transmission request for the original image has not been received (NO in step S906), the processing proceeds to step S910.

In step S907, the control unit 201 transmits the request email display data to the viewing PC 103. This request email display data is information for requesting confirmation by the viewing user of the viewing PC 103 of the text of the email transmitted for original image transmission.

Specifically, the control unit 201 searches for the album identifier 404 matching the album identifier 407 that is associated with the image identifier 408. In addition, the control unit 201 searches for the registration user identifier 401 matching the registration user identifier 403 that is associated with the album identifier 404. Further, the control unit 201 acquires the email address of the registration user from the registration user information 402 associated with the searched-for registration user identifier 401, and sets the acquired email address as the email destination. The thumbnail image of the image that is the request target is attached to the email, and the file name of the image is described in the email.

On the other hand, at the viewing PC 103, a request email confirmation screen is displayed on the display device 206 based on the request email display data. The viewing user confirms the text of the email displayed on the request email confirmation screen, and if the viewing user wishes to transmit the email to the registration user, inputs an email transmission request to the viewing PC 103. In response to this, the viewing PC 103 transmits the email transmission request to the server apparatus 101. Next, in step S908, the control unit 201 determines whether an email transmission request has been received from the viewing PC 103. If the control unit 201 determines that an email transmission request has been received (YES in step S908), the processing proceeds to step S909. If the control unit 201 determines that an email transmission request has not been received (NO in step S908), the control unit 201 finishes the processing. In step S909, the control unit 201 transmits the email requesting transmission of the original image, and then finishes the processing.

Subsequently, the registration user reads the email, and if the registration user has the original image corresponding to the requested image, the registration PC 102 uploads the original image to the server apparatus 101 based on an operation by the registration user. If the registration PC 102 receives a request for original image transmission and uploads the image, the registration PC 102 may also transmit, for example, the thumbnail image attached to the email or the file name described in the email along with the original image to the server apparatus 101. Consequently, at the server apparatus 101, the fact that the uploaded image is the original image corresponding to an edited image that has already been uploaded can be identified. The server apparatus 101 overwrites the edited image stored in the storage device 209 that had already been uploaded, and stores the original image in the storage device 209. Consequently, storage space can be reduced. As another example, the server apparatus 101 can also store the original image and the edited image in the storage device 209.

Thus, the original image can be acquired by the server apparatus 101 according to the present exemplary embodiment. This can prevent the server apparatus 101 from executing various processes using an edited image that has a lower resolution despite the fact that a high-resolution original image exists. Namely, the server apparatus 101 can provide the viewing user with a high quality service.

As a first modification example of the above-described exemplary embodiment, in the processing performed when an execution request has been received (FIG. 9), the server apparatus 101 may store the content of the predetermined processing for which an execution request has been received from the viewing PC 103 until the uploading of the original image has been completed. Further, when the uploading of the requested original image has been completed, the server apparatus 101 may automatically execute various predetermined processes on the original image based on the stored content. Further, as a second modification example, the viewing PC 103 may transmit to the server apparatus 101 a transmission request for the original image in response to, for example, the viewing user performing a pressing operation of the edit mark 503 on the album list screen 501. Similarly, the viewing PC 103 may transmit to the server apparatus 101 a transmission request for the original image in response to, for example, a pressing operation of the edit mark 523 on the album details screen 521. In this case, when the server apparatus 101 has received the transmission request, the server apparatus 101 executes the processing from step S907 onwards that has been described with reference to FIG. 9.

Further, as a third modification example, the server apparatus 101 may transmit a completion notification notifying the viewing user that the uploading of the requested original image has been completed to a terminal being used by the viewing user, such as the viewing PC 103. This enables the viewing user to issue an instruction for predetermined processing using the original image. On the other hand, if the requested original image is not present, the server apparatus 101 may transmit an error notification notifying the viewing user that the original image is not present to the viewing PC 103, for example. Examples of cases in which the original image is not present may include cases such as when the original image has been deleted from the registration PC 102 by the registration user. Additionally, in this case, the server apparatus 101 can automatically execute predetermined processing relating to the execution request on the edited image.

Further, as a fourth modification example, in step S309 of the upload processing (FIG. 3), when an edited image is to be transmitted, the registration PC 102 may also transmit original image display permission information to the server apparatus 101. This original image display permission information is information indicating whether to permit the display of the original image corresponding to the edited image to be transmitted. Moreover, the server apparatus 101 adds the edit mark in the album list display data transmission processing (FIG. 6) and the album details display data transmission processing (FIG. 8) only when the original image display permission information indicates permission of the display of the original image. Namely, if the display of the original image is not permitted, the server apparatus 101 generates and transmits album list display data or album details display data that does not have an edit mark.

Thus, according to each of the above-described exemplary embodiments, the user can be notified of the presence of original content corresponding to content that is registered in a server apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2013-047118 filed Mar. 8, 2013, which is hereby incorporated by reference herein in its entirety.

What is claimed is:

1. A content management system comprising a server apparatus and a plurality of client apparatuses that are communicating with each other via a network, the plurality of client apparatuses including a first client apparatus and a second client apparatus,
the first client apparatus comprising:
a processor; and
a memory storing a program which, when executed by the processor, causes the first client apparatus to:
store a plurality of content pieces;
selectively edit the content pieces before uploading the content pieces;
store the content pieces in association with editing information indicating that a content piece has been edited before uploading the content piece to the server apparatus, or store the content piece in association with editing information indicating that the content piece has not been edited before uploading the content piece to the server apparatus; and
upload, to the server apparatus, either the content pieces which have been edited before uploading or the content pieces which have not been edited before uploading and the editing information corresponding to the content pieces to be uploaded,
the server apparatus comprising:
a processor; and
a memory storing a program which, when executed by the processor, causes the server apparatus to:
receive the content pieces and the editing information from the first client apparatus;
store the received content pieces and the editing information in a storage device;
receive a first request for the content pieces from the second client apparatus which differs from the first client apparatus;
determine, based on the editing information, whether each of the content pieces corresponding to the first request have been edited before being uploaded to the server apparatus;
generate display data for displaying each of the content pieces with a mark indicating whether the content piece has been edited before being uploaded to the server apparatus;
transmit the display data to the second client apparatus;
receive, from the second client apparatus, a second request for a first content piece which is one of the content pieces displayed based on the display data;
issue, to the first client apparatus, after receiving the second request, a third request for a second content piece which corresponds to the first content piece and has not been edited if the first content piece has been edited before being uploaded to the server apparatus; and
receive, from the first client apparatus, the second content piece; and
store the second content piece in place of the first content piece in the storage device.

2. A server apparatus communicating with a plurality of client apparatuses via a network, the server apparatus comprising:

a processor; and a memory storing a program which, when executed by the processor, causes the server apparatus to:

receive, from a first client apparatus, a plurality of content pieces and associated editing information indicating whether each content piece has been edited before being uploaded to the server apparatus;

store the received content pieces and the editing information in a storage device;

receive a first request for the content pieces from a second client apparatus which differs from the first client apparatus;

determine, based on the editing information, whether each of the content pieces corresponding to the first request have been edited before being uploaded to the server apparatus;

generate display data for displaying each of the content pieces with a mark indicating whether the content piece has been edited before being uploaded to the server apparatus;

transmit the display data to the second client apparatus;

receive, from the second client apparatus, a second request for a first content piece which is one of the content pieces displayed based on the display data;

issue, to the first client apparatus, after receiving the second request, a third request for a second content piece which corresponds to the first content piece and has not been edited if the first content piece has been edited before being uploaded to the server apparatus;

receive, from the first client apparatus, the second content piece; and store the second content piece in place of the first content piece in the storage device.

3. The server apparatus according to claim 2, is caused further to:

determine, based on the editing information, whether at least one of the contents belonging to a group corresponding to the first request is edited; and generate display data for displaying a representative content of the group with a mark indicating whether at least one of the contents belonging to the group.

4. The server apparatus according to claim 2, wherein the content is image data and edited by resizing or trimming.

5. A method for controlling a server apparatus communicating with a plurality of client apparatuses via a network, the method comprising:

receiving, from a first client apparatus, a plurality of content pieces and associated editing information indicating whether each content piece has been edited before being uploaded to the server apparatus;

storing the received content pieces and the editing information in a storage device;

receiving a first request for the content pieces from a second client apparatus which differs from the first client apparatus;

determining, based on the editing information, whether each of the content pieces corresponding to the first request have been edited before being uploaded to the server apparatus;

generating display data for displaying each of the content pieces with a mark indicating whether the content piece has been edited before being uploaded to the server apparatus;

transmitting the display data to the second client apparatus;

receiving, from the second client apparatus, a second request for a first content piece which is one of the content pieces displayed based on the display data;

issuing, to the first client apparatus, after receiving the second request, a third request for a second content piece which corresponds to the first content piece and has not been edited if the first content piece has been edited before being uploaded to the server apparatus;

receiving, from the first client apparatus, the second content piece; and storing the second content piece in place of the first content piece in the storage device.

6. A non-transitory computer-readable storage medium storing a program that causes a computer serving as a server apparatus communicating with a plurality of client apparatuses via a network to execute a control method, the control method comprising:

receiving, from a first client apparatus, a plurality of content pieces and associated editing information indicating whether each content piece has been edited before being uploaded to the computer serving as the server apparatus;

storing the received content pieces and the editing information in a storage device;

receiving a first request for the content pieces from a second client apparatus which differs from the first client apparatus;

determining, based on the editing information, whether each of the content pieces corresponding to the first request have been edited before being uploaded to the computer serving as the server apparatus;

generating display data for displaying each of the content pieces with a mark indicating whether the content piece has been edited before being uploaded to the computer serving as the server apparatus;

transmitting the display data to the second client apparatus;

receiving, from the second client apparatus, a second request for a first content piece which is one of the content pieces displayed based on the display data;

issuing, to the first client apparatus, after receiving the second request, a third request for a second content piece which corresponds to the first content piece and has not been edited if the first content piece has been edited before being uploaded to the computer serving as the server apparatus;

receiving, from the first client apparatus, the second content piece; and storing the second content piece in place of the first content piece in the storage device.

* * * * *